United States Patent
Shah et al.

(10) Patent No.: US 6,275,242 B1
(45) Date of Patent: Aug. 14, 2001

(54) METHOD AND APPARATUS FOR TERMINATING DIRECT MEMORY ACCESS TRANSFERS FROM SYSTEM MEMORY TO A VIDEO DEVICE

(75) Inventors: Nilesh V. Shah, Folsom; Andrew E. Roedel, Sunnyvale; Cliff D. Hall, Orangevale, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,657

(22) Filed: Dec. 31, 1998

(51) Int. Cl.$^7$ .............................. G06F 13/16; G06F 13/28
(52) U.S. Cl. .............................. 345/533; 345/503; 710/22
(58) Field of Search ..................................... 345/501, 503, 345/520, 531, 533, 541, 555; 710/22, 26, 28, 32, 267

(56) References Cited

U.S. PATENT DOCUMENTS

| | | | |
|---|---|---|---|
| 5,896,550 | * | 4/1999 | Wehunt et al. .......................... 710/26 |
| 5,990,958 | * | 11/1999 | Bheda et al. ........................... 348/407 |
| 6,034,733 | * | 3/2000 | Malram et al. ....................... 348/448 |
| 6,052,744 | * | 4/2000 | Moriarty et al. ....................... 710/27 |
| 6,058,459 | * | 5/2000 | Owen et al. .......................... 711/151 |
| 6,111,592 | * | 8/2000 | Yagi ...................................... 345/511 |
| 6,173,358 | * | 1/2001 | Combs .................................. 711/100 |
| 6,199,121 | * | 3/2001 | Olson et al. ........................... 710/24 |

OTHER PUBLICATIONS

Sase, I. et al. "Multimedia LSI Accelerator with Embedded DRAM", IEEE Micro, 1997, pp. 49–54.*
Blumrich, M. et al., "Protected, User–level DMA for the Shrimp Network Interface", Second International Symposium on High–Performance Architecture, 1996, pp. 154–165.*

* cited by examiner

*Primary Examiner*—Ulka J. Chauhan
(74) *Attorney, Agent, or Firm*—Calvin E. Wells

(57) ABSTRACT

An embodiment of a method for terminating direct memory access transfers from system memory to a video device includes completing a current byte transfer from a graphics controller to a video device and then refraining from initiating any further write cycles associated with a DMA transfer to the video device. The graphics controller then allows uninterrupted or atomic read and write cycles to the video device. The graphics controller also completes any current read cycles on a system bus that had previously been initiated. The graphics controller then resets its DMA engine and invalidates all information in a first-in, first-out (FIFO) storage buffer.

19 Claims, 4 Drawing Sheets

METHOD AND APPARATUS FOR TERMINATING DIRECT MEMORY ACCESS TRANSFERS FROM SYSTEM MEMORY TO A VIDEO DEVICE

FIELD OF THE INVENTION

The present invention pertains to the field of direct memory access transfers in a computer system. More particularly, this invention pertains to the field of terminating direct memory transfers between system memory and a video device.

BACKGROUND OF THE INVENTION

Video devices such as Digital Versatile Disc (DVD) decoders are now being regularly included in computer systems. Such decoders receive an encoded input and produce a decoded and displayable output. In a typical computer system, a stream of encoded information is moved from a storage device such as a DVD drive to system memory. From system memory, the encoded information is moved through a graphics controller and to a decoding device. The movement of encoded information from system memory to the decoding device typically occurs via direct memory access (DMA) under control of the graphics controller. The graphics controller also allows read and write cycles to the decoding device for configuration or status checking purposes. The graphics controller typically allows the DMA transfers and the read and write cycles to be interwoven, with the read and write cycles having precedence over the DMA transfers. For computer systems with an Accelerated Graphics Port (AGP) architecture, the size of the DMA transfers from system memory to the decoding device may be as large as 2 Mbytes. The transfer is performed as a series of 32 byte cycles on the AGP.

An undesirable situation occurs when a configuration cycle needs to be performed and the graphics controller is in the process of streaming a large amount of encoded information to the decoding device. 2 Mbytes of encoded video information may represent 1–2 seconds of real time video. The configuration cycle may be a result of an computer user requesting that the video pause, rewind, fast forward, stop, etc. Unless there is a way to abort the current DMA transfer, the user will experience a 1–2 second delay in response time. Further, the DMA transfer must be terminated properly so as to not violate the various bus protocols. For example, on AGP, once a read cycle has been initiated by an AGP agent, the agent must be able to receive the returned information when it is delivered. There is no mechanism on AGP to abort a read cycle once the read request has been issued.

The above mentioned issue could be solved by limiting the size of DMA transfers. However, this increases the amount of system overhead required to move the encoded information from system memory to the decoding device, which may result is visual quality degradation due to possible skipped frames.

SUMMARY OF THE INVENTION

A method and apparatus for terminating direct memory access transfers from system memory to a video device is disclosed. The method includes halting at least one pending direct memory access write cycle to the video device as well as allowing an uninterrupted read and write access to the video device. The method also includes completing a current direct memory access read cycle from a memory device and resetting a direct memory access register and a temporary storage location.

Other features and advantages of the present invention will be apparent from the accompanying drawings and from the detailed description that follows below.

BRIEF DESCRIPTION OF THE DRAWINGS

The invention is illustrated by way of example and not limitation in the figures of the accompanying drawings, in which like references indicate similar elements, and in which.

DETAILED DESCRIPTION

An embodiment of a method for terminating direct memory access transfers from system memory to a video device includes completing a current byte transfer from a graphics controller to a video device and then refraining from initiating any further write cycles associated with a DMA transfer to the video device. The graphics controller then allows uninterrupted or atomic read and write cycles to the video device. The graphics controller also completes any current read cycles on a system bus that had previously been initiated. The graphics controller then resets its DMA engine and invalidates all information in a first-in, first-out (FIFO) storage buffer. The embodiment has an intended advantage of reducing user response time by allowing an interruption of a current DMA transfer while maintaining proper bus protocol.

Figure 1:
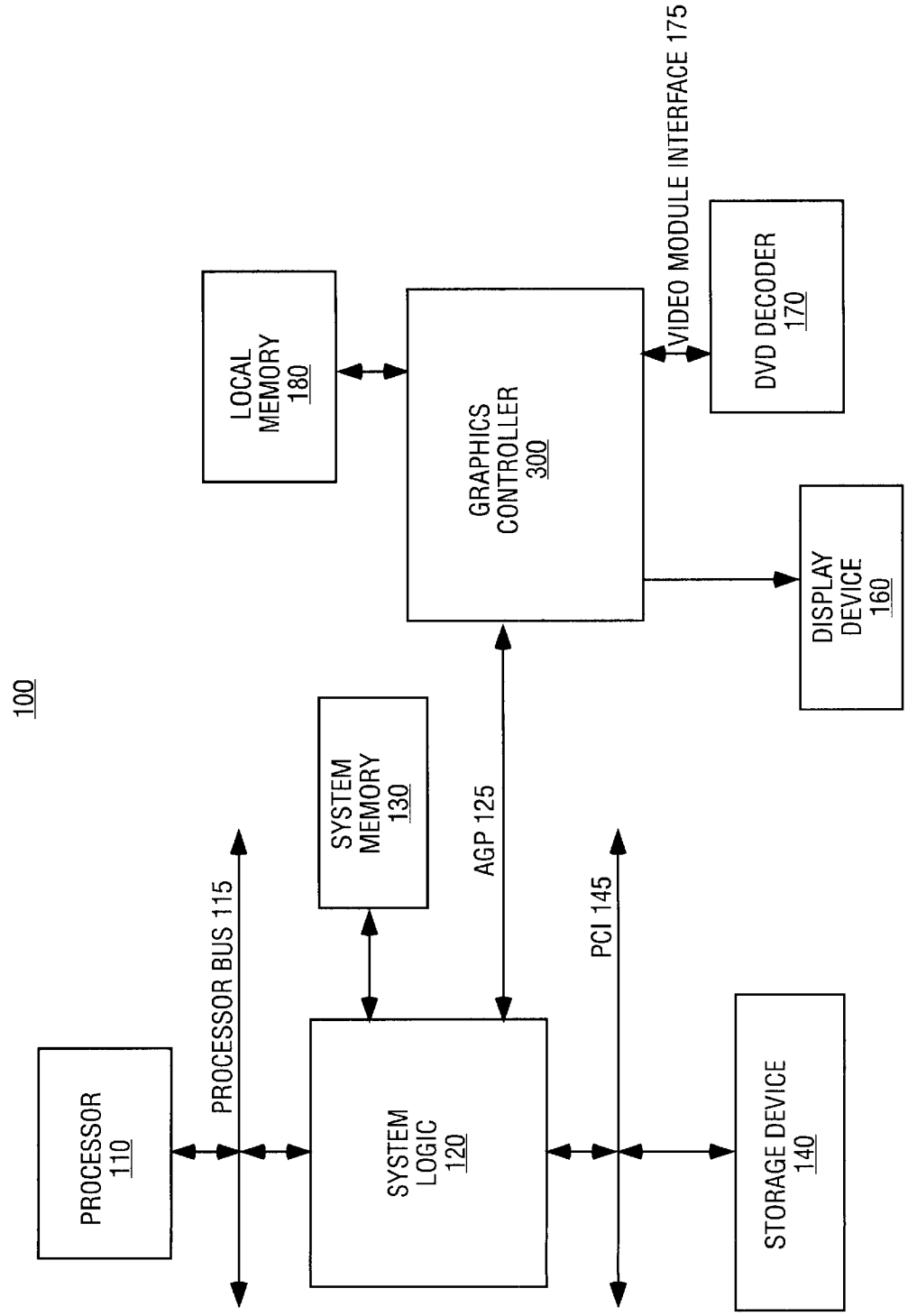
FIG. 1 shows a block diagram of one embodiment of a computer system including a graphics controller and a digital versatile disc decoder.

FIG. 1 shows a block diagram of one embodiment of a computer system 100 including a graphics controller 300 and a digital versatile disc decoder 170. The system 100 includes a processor 110 coupled to a processor bus 115. Also coupled to the processor bus 115 is a system logic device 120. The system 100 further includes a system memory 130 coupled to the system logic device 120. A storage device 140 is coupled to the system logic device 120 via a peripheral component interconnect (PCI) bus 145. A graphics controller 300 is coupled to the system logic device 120 via an advanced graphics port (AGP) 125. A graphics device local memory 180 and a display device 160 are coupled to the graphics controller 300. A DVD decoder 170 is preferably coupled to the graphics controller 300 via a Video Module Interface (VMI) 175. Alternatively, the DVD decoder may be coupled to the graphics controller via any other interface meant to transfer information between a graphics device and a video device, including, but not limited to, a Video Interface Port (Video Electronics Standards Association Video Interface Port (VIP) Standard, version 1.1, published November, 1997).

The storage device 140 is meant to represent a broad range of devices which may store encoded video information or which may read encoded video information from a medium, such as a DVD. For this example embodiment, the storage device preferably includes a DVD drive. Further, although a DVD decoder is mentioned in connection with this embodiment, any video device that receives DMA information from system memory may be used. Similarly, other busses between the system logic device 120 and the graphics controller 300 are possible.

During video playback, encoded video information is read from the storage device 140 and stored in the system memory 130. The graphics controller 300 then sets up a DMA transfer of preferably 2 Mbytes from the system memory 130 to the DVD decoder 170. The transfer preferably occurs 32 bytes at a time over the AGP 125. The encoded video information is then sent to the DVD decoder 170 1 byte at a time over the VMI 175. The DVD decoder 170 delivers decoded information to the graphics controller 300 and the graphics controller 300 prepares the decoded video information for display on the display device 160.

When for some reason it is necessary to terminate the DMA transfer, for example if a computer system user who is currently viewing a DVD movie decides to pause the movie, the graphics controller 300 first completes any current byte transfer from the graphics controller 300 to the DVD decoder 170. The graphics controller 300 then refrains from initiating any further write cycles that are associated with the current DMA transfer to the DVD decoder 170. The graphics controller 300 then allows uninterrupted or atomic read and write cycles to the DVD decoder 170. The nature of these read and/or write cycles are device dependent, and may differ from one video device vendor to another. The graphics controller 300 also completes any current read cycle on the AGP 125 bus that has previously been initiated. The graphics controller 300 then resets its DMA unit 330 (shown in FIG. 3) and invalidates all information in a first-in, first-out (FIFO) storage buffer 339 (shown in FIG. 3). The DMA transfer is now terminated while maintaining proper AGP 125 protocol, and the graphics controller 300 may now allow processing of the user event (pause, rewind, etc.).

Figure 2:
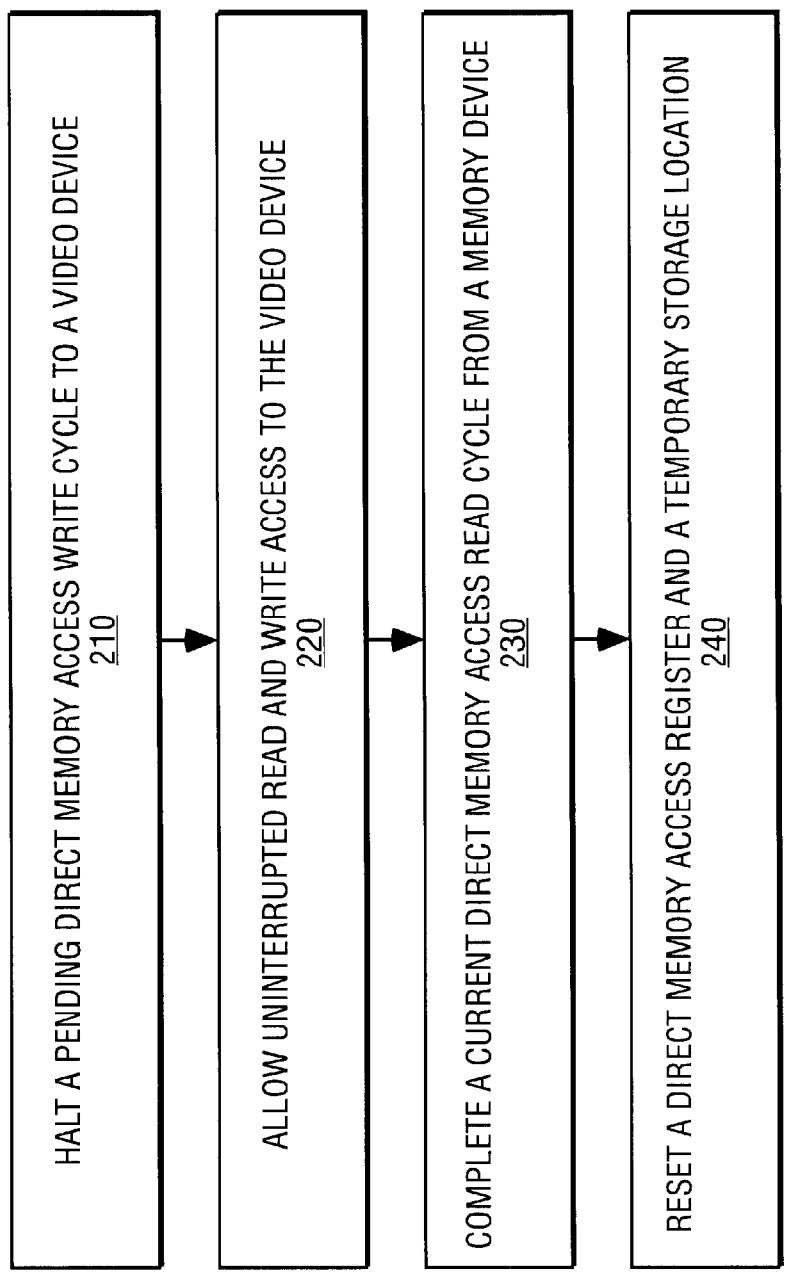
FIG. 2 is a flow diagram of one embodiment of a method for terminating a direct memory access transfer from system memory to a video device.

FIG. 2 is a flow diagram of one embodiment of a method for terminating a direct memory access transfer from system memory to a video device. At step 210, a pending DMA write cycle to a video device is halted. Preferably, every pending DMA write cycle following a current write cycle is halted. Subsequently, at step 220, uninterrupted read and write access to the video device is allowed. These read and write cycles are not associated with any DMA transfer. At step 230, a current DMA read cycle from a memory device is completed. Finally, at step 240, a direct memory access register and a temporary storage location are reset.

Figure 3:
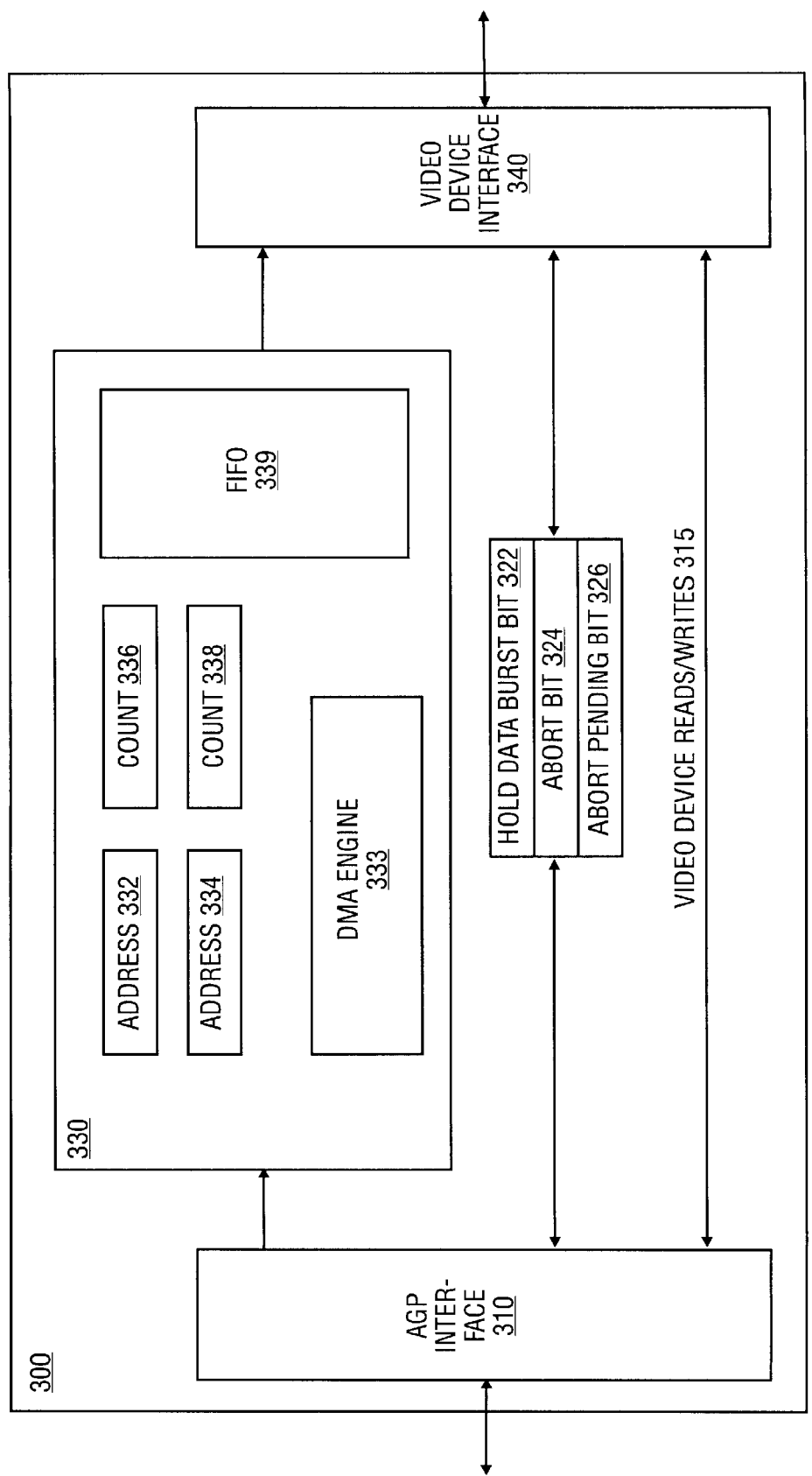
FIG. 3 is a block diagram of one embodiment of a graphics controller including a direct memory access unit and a video device interface.

FIG. 3 is a block diagram of one embodiment of a graphics controller 300 including a direct memory access unit 330 and a video device interface 340. The graphics controller 300 is also shown as part of the computer system 100 in FIG. 1. The DMA unit 330 includes an address register 332 and an additional address register 334. Also included in the DMA unit 330 is a count register 336 and an additional count register 338. The address registers 332 and 334 store beginning addresses for blocks of information to be retrieved from system memory. The two count registers 336 and 338 store the number of 32 byte cycles necessary to complete a DMA transfer. Two address and counter registers are included in order to "pipeline" DMA transfers. While a current DMA transfer is using the address register 332 and the counter register 336, a subsequent DMA transfer can be set up using the other address and counter registers 334 and 338. The DMA transfers are set up by a software agent executed on a processor (not shown) and controlled by a DMA engine 333. The DMA unit 330 receives video information via an AGP interface 310, which communicates with system memory (not shown) via an AGP (not shown).

The information retrieved from system memory is stored in a FIFO 339. The FIFO 339 is preferable capable of storing 64 bytes of information. When the FIFO 339 contains fewer than 32 bytes of valid information, a new DMA read cycle is performed in order to keep the FIFO 339 loaded with valid information. The FIFO 339 provides video information to a Video Device Interface 340, which communicates with an external video device, such as a DVD decoder (not shown).

The graphics controller also includes a hold data burst bit 322, an abort bit 324, and an abort pending bit 326. When the hold data burst bit 322 is set by the software agent, the video device interface 340 completes any current byte transfer to the external video device. The video device interface 340 also refrains from issuing any further write cycles associated with information data from the FIFO 339. While the hold data burst bit 322 is set, read and write cycles issued by the software agent are permitted using a video device read/write path 315. The nature of the read and write transfers will vary according to which external video device is being used.

When the abort bit 324 is set by the software agent, the graphics controller 300 responds by setting the abort pending bit 326, thereby signaling to the software that an abort is in progress. Also in response to the setting of the abort bit, the AGP interface 310 will complete any current DMA read cycle on AGP correctly and the DMA unit 330 will invalidate all information stored in the FIFO 339. The software agent should not issue new DMA transfers while the abort pending bit 326 is set. Once any current DMA read cycle on AGP is completed and once any current byte transfer to the video device is completed, the address registers 332 and 334 are reset, along with the counter registers 336 and 338. Once the DMA unit registers are reset and the FIFO 339 is cleared, the graphics controller 300 clears the abort pending bit 326. Once the abort pending bit 326 is cleared, the software may clear the hold data burst bit 322 and the abort bit 324.

The functions associated with the hold data burst bit 322, the abort bit 324, and the abort pending bit 326 allow the software agent to interrupt a potentially lengthy (up to 2 Mbytes) DMA transfer between system memory and an external video device. This allows the software agent to respond quickly to events such as a user requesting to pause or stop a video display.

Figure 4:
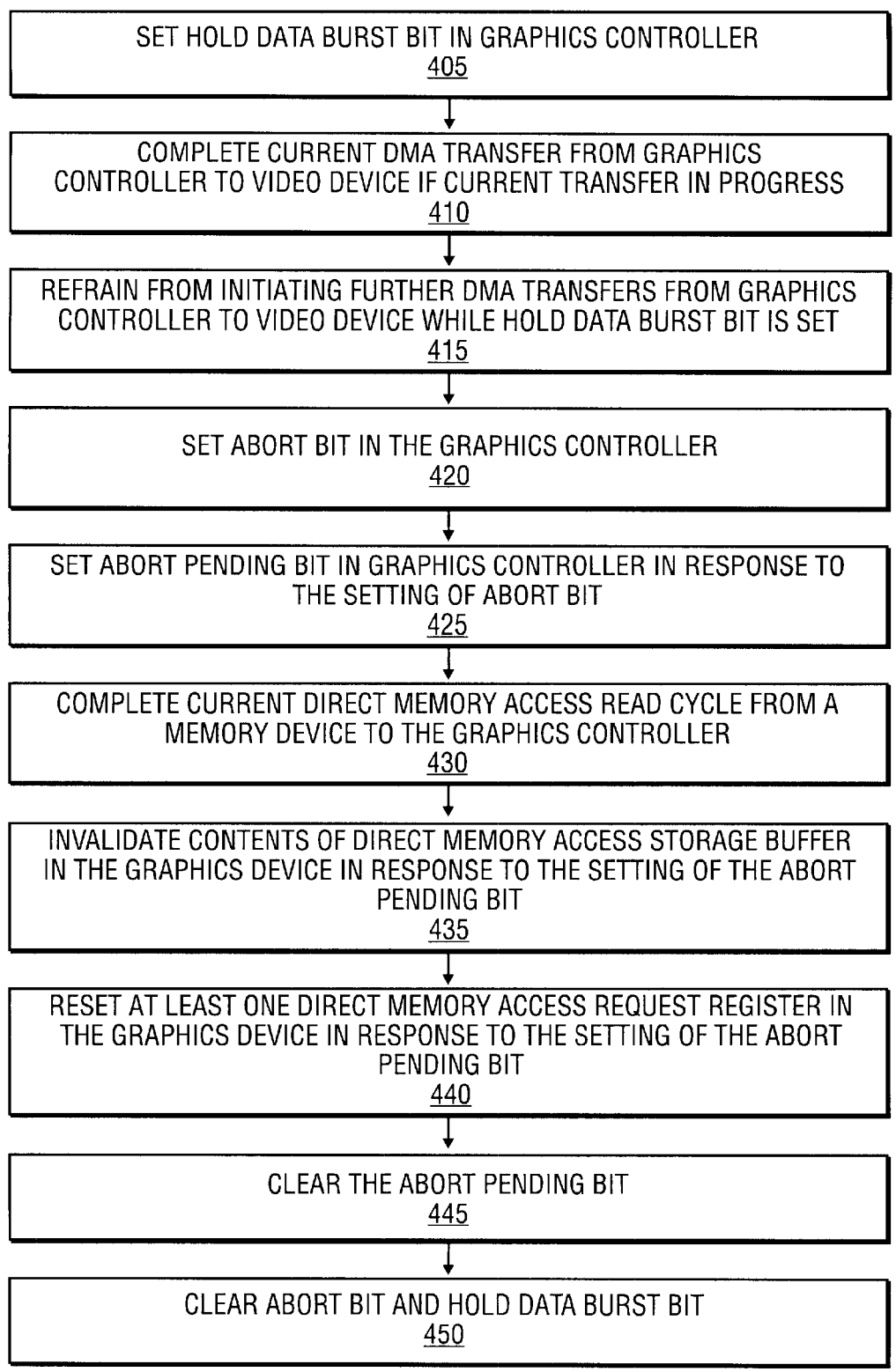
FIG. 4 is a flow diagram of one embodiment of a method for terminating a direct memory access transfer from system memory to a video device.

FIG. 4 is a flow diagram of one embodiment of a method for terminating a direct memory access transfer from system memory to a video device. At step 405, a software agent sets a hold data burst bit in a graphics controller. While the hold data burst bit is set the software agent can communicate with a video device without conflicting with a DMA transfer. At step 410, in response to the setting of the hold data burst bit, any current write cycle of DMA information from the graphics controller to the video device is completed. The graphics controller is refrained from initiating further write cycles including information associated with a DMA transfers to the video device at step 415. An abort bit in the graphics controller is set by the software agent at step 420. In response to the setting of the abort bit, the graphics controller sets an abort pending bit at step 425. Also in response to the setting of the abort bit, the graphics controller completes a current direct memory access read cycle from a memory device to the graphics controller at step 430. At step 435, the graphics controller invalidates the contents of a direct memory access storage buffer after setting the abort pending bit. The graphics controller then resets at least one direct memory access request register in response to the setting of the abort pending bit at step 440. At step 445, the graphics controller clears the abort pending bit and finally at step 450 the software agent clears the abort bit and the hold data burst bit.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   halting at least one pending direct memory access write cycle to a video device;
   allowing an uninterrupted read and write access to the video device;
   completing a current direct memory access read cycle from a memory device; and
   resetting a direct memory access register and a temporary storage location.

2. The method of claim 1 wherein halting at least one pending direct memory access includes halting at least one pending direct memory access write cycle from a graphics controller to an external video device.

3. The method of claim 2 wherein halting at least one pending direct memory access write cycle from a graphics controller to an external video device includes halting at least one pending direct memory access write cycle from a graphics controller to a digital versatile disc decoder.

4. The method of claim 1 wherein allowing an uninterrupted read and write access to the video device includes allowing an uninterrupted read and write access over a Video Module Interface.

5. The method of claim 1 wherein allowing an uninterrupted read and write access to the video device includes allowing an uninterrupted read and write access over a Video Interface Port.

6. The method of claim 1 wherein resetting a direct memory access register and a temporary storage location includes resetting a direct memory access request register and a direct memory access storage first in, first out buffer.

7. A method, comprising:
   setting a hold data burst bit in a graphics controller;
   completing a current information transfer associated with a direct memory access from the graphics controller to a video device if the current information transfer is in progress;
   refraining from initiating a further information transfer associated with a direct memory access from the graphics controller to the video device while the hold data burst bit is set;
   setting an abort bit in the graphics controller;
   setting an abort pending bit in the graphics controller in response to the setting of the abort bit;
   completing a current direct memory access read cycle from a memory device to the graphics controller;
   invalidating a contents of a direct memory access storage buffer in the graphics controller in response to the setting of the abort pending bit;
   resetting at least one direct memory access request register in the graphics device in response to the setting of the abort pending bit;
   clearing the abort pending bit; and
   clearing the abort bit and the hold data burst bit.

8. An apparatus, comprising:
   a direct memory access unit to perform at least one memory read cycle from a memory device and at least one write cycle to a video device;
   a first storage location to indicate to a video device interface circuit to halt at least one pending direct memory access write cycle to the video device when the first storage location contains a first predetermined value; and
   a second storage location to indicate to a system bus interface circuit to complete at least one current direct memory access read cycle when the second storage location contains a second predetermined value, the video device interface circuit further to reset the direct memory access unit in response to the second storage location containing the second predetermined value.

9. The apparatus of claim 8, further comprising a third storage location, the video device interface circuit to place a third predetermined value into the third storage location to indicate that the direct memory access unit has not been reset.

10. The apparatus of claim 9, wherein the video device interface circuit places a fourth predetermined value into the third storage location to indicate that the direct memory access unit has been reset.

11. The apparatus of claim 9 wherein the first storage location, the second storage location, and the third storage location each include a bit in a register.

12. The apparatus of claim 11 wherein the direct memory access unit includes a direct memory access address register, a direct memory access counter register, and a first-in, first-out buffer.

13. The apparatus of claim 12 wherein the first-in, first-out buffer is configured to store a maximum of 64 bytes of information.

14. The apparatus of claim 13 wherein the direct memory access unit reads 32 bytes of information from the memory device for the read cycle.

15. The apparatus of claim 13 wherein the direct memory access unit writes one byte of information to the video device for the write cycle.

16. A system, comprising:
   a memory device coupled to a system bus;
   a video device couple to a video bus;
   a graphics controller coupled to the system bus and further coupled to the video bus, the graphics controller including
      a direct memory access unit to perform at least one memory read cycle from the memory device and at least one write cycle to the video device;
      a first storage location to indicate to a video device interface circuit to halt at least one pending direct memory access write cycle to the video device when the first storage location contains a first predetermined value; and
      a second storage location to indicate to a system bus interface circuit to complete at least one current direct memory access read cycle when the second storage location contains a second predetermined value, the video device interface circuit further to reset the direct memory access unit in response to the second storage location containing the second predetermined value.

17. The system of claim 16 wherein the system bus includes an advanced graphic port.

18. The system of claim 16 wherein the video bus includes a video module interface.

19. The system of claim 16 wherein the video bus includes a video interface port.

* * * * *